Oct. 31, 1933.  C. L. STEVENS  1,932,426
METHOD OF MAKING DIES
Filed June 22, 1931  2 Sheets-Sheet 1

INVENTOR
Claud L. Stevens.
BY
Harness, Dickey, Pierce + Hamm
ATTORNEYS.

Oct. 31, 1933.  C. L. STEVENS  1,932,426
METHOD OF MAKING DIES
Filed June 22, 1931  2 Sheets-Sheet 2
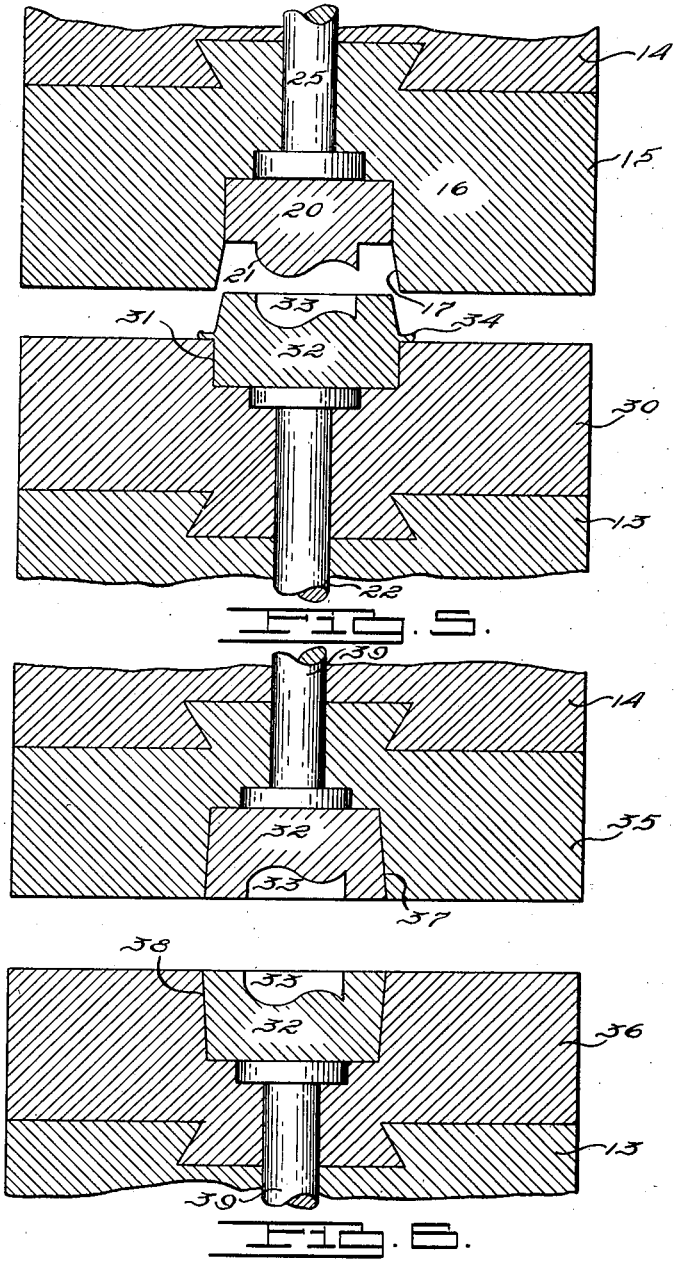
INVENTOR
Claud L. Stevens
BY
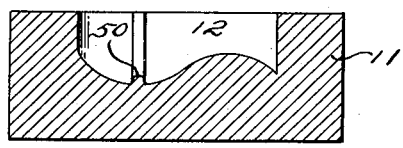
ATTORNEYS.

Patented Oct. 31, 1933

1,932,426

UNITED STATES PATENT OFFICE 1,932,426

METHOD OF MAKING DIES

Claud L. Stevens, Detroit, Mich.

Application June 22, 1931. Serial No. 545,868

8 Claims. (Cl. 76—107)

This application is a continuation in part of my co-pending application Serial Number 455,838, filed May 26, 1930.

This invention relates to dies and the method of making the same, and particularly to a method of making dies by the type method as differentiated from the method of making dies by removing the necessary stock from a block of hardenable die material to form the desired depression therein.

Another object is to provide a method of making dies comprising in first making a master die, thereafter employing the master die to make a male die or type member, and thereafter employing the male die or type member to form a female die member by forcing the male member into the female member to cause the desired depression to be formed therein, and thereafter employing the female member for productive purposes.

Another object is to provide a method as above described in which the master die is constructed to provide for a triple shrinkage, resulting in a double shrinkage being provided on the male die or type member, and a single shrinkage resulting in the die to be employed for production.

Another object is to provide a method of pressing a male die member into a block of die stock to form a complementary female member comprising in heating the block of stock beyond its critical temperature and maintaining it against oxidization while pressing the male member thereinto.

Another object is to provide a method of pressing a male die member into a block of die stock to form a complementary female member comprising in heating the block of stock beyond its critical temperature and limiting it against lateral spreading while pressing the male member thereinto.

Another object is to provide means for forming on or in a die block, a projection or depression complementary to a preformed depression or projection, comprising the provision of a die member having formed therein or thereon a depression or projection complementary to the projection on or depression in the die desired, providing a retaining wall about such die member, and then pressing a heated block of die stock against said preformed member while said block of die stock is laterally supported by said retaining wall.

Another object is to provide a die half comprising an insert retaining die block provided with a recess therein, and an insert secured in the recess.

Another object is to provide a die half comprising an insert retaining die block provided with a recess therein, and an insert secured in the recess by shrinkage of the retaining die block.

Another object is to provide an insert retaining die block as above described with a knock-out pin for each insert.

Another object is to provide a simple and economical method of changing the shape of a die by a welding process after the die has been completed.

Another object is to provide a method of adding material to a die after the die has been completed, comprising in depositing metal of the desired analysis over the desired areas of the die by a welding process carried on in a reducing or non-oxidizing atmosphere, and then re-machining the depression.

Another object is to provide a method of forming dies in which any possibility of the distortion of the die surface due to the flowing of the metal to form a flash is obviated.

Other objects will be apparent or will be specifically pointed out in the following specification, reference being had to the accompanying drawings, in which—

Fig. 5 is a view similar to Fig. 3 illustrating the manner in which the male die member or type is employed for forming the die insert block to be employed for productive purposes.

Fig. 6 is a view similar to Figs. 3 and 5 illustrating the position in which the die insert blocks assume in the hammer or press to form the article illustrated in Fig. 1.

Fig. 7 is a view similar to Fig. 2 illustrating a method by which the master die may be changed in shape after having been once completed and without affecting its accuracy or length of life.

Figure 1:
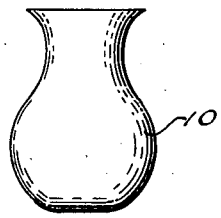
Fig. 1 is a front elevation of a more-or-less imaginary object which it may be desired to form.

It has heretofore been proposed to form dies for forging or other purposes by first making a male member or type complementary to at least a portion of the finished article desired, and then forcing this male member or type into a block of steel or other suitable metal to form the desired depression therein for the purposes of employing it as a die, this method being contrary to conventional practice wherein the die depressions are machined out of the metal rather than being formed in it as described.

There are numerous advantages to be derived by forming a die by pressing a type into a suitable block or stock, over the conventional method, such as for instance, relative cheapness, but more important is the fact that by the conventional method the depression in being cut necessarily exposes the ends of the fibrous structure of the metal in the walls of the depression, and the ends of these fibers break down relatively fast due to the washing action of the metal being forged therein. In forming such dies by pressing into the stock from which they are made a male member or type, the fibers of the block are not severed at any time but are merely bent to accommodate the shape of the type, and consequently no exposed fiber ends are present in the die depression which will foster breaking down of the depression and consequent destruction of the die member.

To my knowledge no method has heretofore been proposed for satisfactorily accomplishing, in a commercial way, the production of die blocks made by forcing a type into a block of die stock, but there are several reasons for this, as will hereinafter be brought out in the following specification.

Heretofore it has been the conventional practice in making dies to provide a relatively thick block of stock of a size approximating the head or table of the hammer or press in which the forging is to be accomplished, and then form the depression in such block of stock. This not only necessitates the handling of a relatively large and heavy block of stock during forming of the dies, but when the dies have become worn to a point where they must be recut or replaced, it is necessary to recut the depression or scrap the entire block.

In accordance with the present invention, instead of following the conventional practice, I provide a block of stock of a size and thickness commensurate with that conventionally employed, and remove from the central portion thereof sufficient metal to form a recess or depression whose dimensions are larger by definite amounts per unit of length than the corresponding dimensions of the depression desired in the final die, and then form a block of die stock of a size commensurate with this recess and form the die depression in this block of stock, and thereafter secure this block of stock into the large block, thereby providing an insert which may be removed and recut if desired, or replaced as occasions of wear or other conditions dictate, and thereby eliminate not only the handling of the large block during machining operations upon the die depression, but further eliminate the waste occasioned in conventional constructions by scrapping the entire block upon excessive wear of the die depression.

Furthermore, in accordance with the present invention I provide a method by which an innumerable number of objects may be forged or otherwise formed by dies with the assurance that all of the objects will be identical with each other.

For the purpose of illustrating the present invention I have illustrated in the accompanying drawings an article 10 which may be considered more-or-less imaginary as far as actual use is concerned, but which is entirely sufficient for explaining the essential of the present invention. It may be noted that it is considered that the article 10 is circular in cross-section, and consequently is identical in size and shape on both sides of a plane including its axis.

Figure 2:
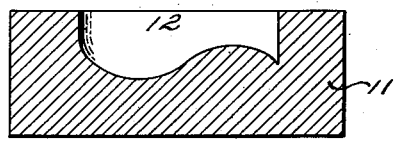
Fig. 2 is a vertical sectional view taken centrally through a master die insert prepared in accordance with the present invention for forming the article shown in Fig. 1.

In accordance with the present invention, in making dies to forge, for instance, the article 10, a block 11 of hardenable die metal, as indicated in Fig. 2, of a size substantially greater than the article 10 as indicated, is worked upon in accordance with conventional practice, that is, by drilling, chipping, grinding and the like, so as to provide in one face thereon a depression 12 complementary in shape to one-half of the article 10, but with this difference,—that a triple shrinkage is provided for in making the depression 12.

Figure 3:
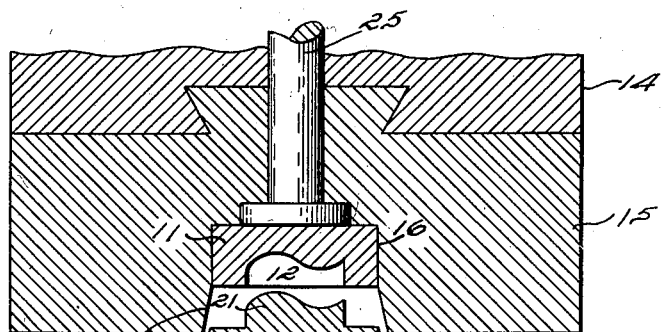
Fig. 3 is a more or less diagrammatic vertical sectional view taken centrally through the die blocks of a power press or power hammer showing the master die illustrated in Fig. 2 supported in the upper die members and illustrating a male die member or type as having been formed therefrom and as being suported in the lower die member.

In Fig. 3 I illustrate the bed 13 and head 14 of a power press, forging hammer or the like, and the head 14 is provided with an insert retainer die block member 15, this member corresponding to the member which in conventional practice has the die depressions formed directly therein. In accordance with the present invention, however, the lower face of the block 15 is cut away to provide a recess 16 therein.

The recess 16 is of rectangular section and is provided with parallel side walls in the upper portion thereof. The side walls of the lower portion of the recess 16, however, are tapered slightly outwardly as at 17 an amount corresponding with the draft conventionally employed in connection with forging or other corresponding dies. The depth of the upper portion having the parallel sides corresponds substantially exactly with the depth of the master die 11 and the dimensions of the same are such that the retainer die block 15 may be suitably heated to expand it, and the master die 11 be inserted therein firmly against the bottom of the same and be securely held therein by shrinkage of the retainer die block 15 when cooled.

The bed or table 13 of the press or hammer is provided with a block 18 similar to the block 15 and the upper surface thereof is provided with a recess 19 of the same size and shape as the portion 17 of the recess 16, but opposed in relation thereto. In other words, its depth is approximately the same depth, although this is not essential, to the depth of the portion 17 of the recess 16, and its side walls taper outwardly from the bottom of the recess to provide the draft conventionally provided for in such dies. It may be noted, however, that it is not necessary that the side walls of the recess 19 be formed tapered as shown, but if desired they may be formed normal to the upper surface of the block 18 for, as will be apparent, when a mass of heated metal as hereinafter described is forged into the recess 19, the object formed thereby will, in cooling, naturally loosen itself in the recess 19 due to its shrinkage, so as to enable it to be easily and readily removed without the aid of a draft.

A mass of metal of suitable size and of proper composition, and which preferably has been heated to beyond its critical temperature in a reducing or non-oxidizing atmosphere as, for instance, by being packed in bone-black or heated in a suitable electric furnace under the influence of a reducing atmosphere, is then placed in the recess 19 while still protected in any suitable manner against oxidization, and the head 14 of the press or hammer is then brought down towards the bed or table 13, causing the metal placed within the depression 19 to not only completely fill the depression 19 but also that part of the depression 16 not filled with the metal of the master die 11, and it is to be noted that during this operation the tapered walls 17 of the recess 16 serve to retain the metal being worked upon against lateral expansion, and thus insures not only a complete filling of the depression 12 in the master die 11, but also insures a proper pressing and working of the mass of metal so as to maintain the quality of the crystalline structure thereof. The critical temperature of the metal is that temperature at which transmission from the crystalline state to that of a solid solution occurs. The amount of metal which is placed within the recess 19 may be readily predetermined so that very little if any flash or fin is formed upon the same during this process.

The result is the provision of a block 20 having formed thereon a type 21 which is complementary in shape and size to the depression 12 in the master die 11, the only difference being that when the type 21 has cooled it is smaller than the depression 12 by an amount equal to the shrinkage of the metal in cooling. In other words, as the depression 12 has been formed to compensate for a triple shrinkage, the type 21 will be formed to compensate for a double shrinkage.

The block 20 with the type 21 formed thereon may now be removed from the depression 19 as by means of a stepped knockout pin 22 which may be provided in the bed 13 and block 18 and with its enlarged head positioned in normally flush relation with respect to the bottom of the recess 19. A similar knockout pin 23 may be provided in the head 14 and block 15 if desired so as to facilitate removal of the master die 11 from the recess 16 upon suitably heating the block 15.

Figure 4:
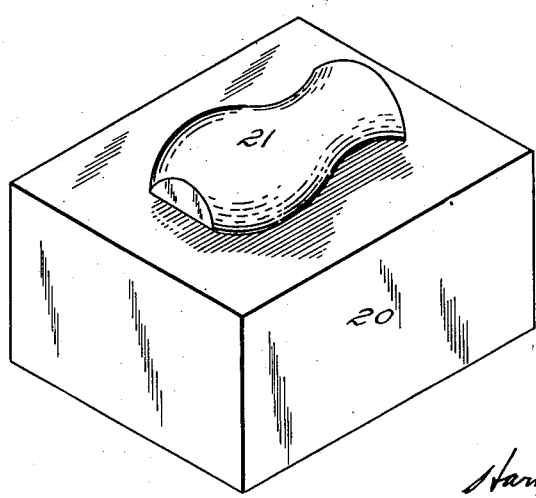
Fig. 4 is a perspective view of the male die insert member or type which is formed by the operation illustrated in Fig. 3, after it has been finish machined.

The block 20 with the type 21 thereon is then preferably machined on the side and bottom faces thereof so as to bring the block 20 to the proper external dimensions, that is, in length, width and thickness, and with the side walls 20 preferably normal to and the face preferably parallel to the top surface thereof as indicated in Fig. 4. It is then hardened in any suitable manner and if necessary the surfaces thereof ground to bring the block to absolutely accurate size and shape and to take care of any warping that may have occurred during the hardening process.

The type thus formed, as indicated in Fig. 4, may then be turned upside down from the position indicated in that figure and inserted in the retainer die block 15 in place of the master die 11, as illustrated in Fig. 5. The block 18 may be replaced with a similar block 30 provided with a recess 31 corresponding to the recess 19 with the exception that its side walls may be normal to the surface of the block 30 instead of at a slight angle thereto as in the case of the recess 19. A block of suitable metal of the desired composition for the final dies, and of a predetermined size as will hereinafter be explained, is then heated to above its critical temperature in a reducing or non-oxidizing atmosphere as previously described in connection with the block 20. It is then placed within the recess 31, immediately covered with a reducing or non-oxidizing substance, and the head 14 is then brought towards the table 13, the metal being caused to flow into the lower portion of the recess 16 and completely filling the same. The tapered side wall 17 maintains it against lateral spreading during this operation so as to insure the metal to firmly and completely embrace all parts of the surface of the type 21 so that upon separation of the head 14 from the table 13, the metal in the recess 31 is formed to provide a block 32 having a depression 33 therein exactly complementary to the type 21 except for the fact that when cooled it will be slightly smaller due to the shrinkage of the metal in cooling and thus, because of the fact that the type 21 is formed to provide for a double shrinkage, is itself formed to provide for a single shrinkage. Likewise the depression 33 will be in exact conformance to the depression 12 in the master die 11 except that it will be of a size two shrinkages smaller than the size of the depression 12.

Only sufficient metal is placed in the depression 31 to insure complete filling of the depressions 31 and fillable portions of the depression 16 when the blocks 15 and 30 are brought together with perhaps the formation of a very slight flash or fin 34. When the block 32 cools it will automatically free itself from frictional engagement with the walls of the depression 31 due to its shrinkage and may be easily removed from the depression 31.

The flash 34 above described, is formed on the sides of the block in a plane considerably below the plane of the surface of the die. The formation of the flash in this position is highly desirable, because the metal forming it is flowed directly from the main body of the block 32, and there is no tendency to deform the working face of the die. If the flash were formed in the plane of the upper or working face of the die, the metal in forming the flash would flow transversely outwardly from cavity into the flash and there would be a tendency for the flowing metal to pull away from the type at the upper edge of the depression 33, thus causing undesirable distortion and an imperfect die cavity. In this connection it might also be noted that the formation of the flash should be limited to a line between the approximately parallel edges of substantially plane side and end faces of the article being formed, that is, there should be no material step in such faces at the point of flash formation, otherwise the action of the dies on the material being formed may result in folds or "pipes" in the article adjacent the location of the die depression or type being formed in or on the same.

The block 32 after being removed from the depression 31 is suitably machined on the side and bottom faces thereof. The sides faces may be machined square with the top face as in the case of the master die 11 and type block 20 and be retained in its corresponding retainer die block in the same manner by a shrink fit, but I prefer that the sides be slightly tapered inwardly towards the bottom an amount, for instance, equal to ⅝″ taper in 1 foot of length, such taper being such that when the block is driven into a correspondingly shaped recess it will be firmly retained therein by the friction set up between the walls of the recess and the sides of the block. The block is then suitably hardened in any conventional manner. The retainer die blocks 15 and 30 are then replaced by retainer die blocks 35 and 36, these blocks being provided with recesses 37 and 38 in their opposed faces complementary in shape to the shape of the block 32 as finally machined, and of the same depth and contour. One block 32 is then driven into the recess 37 in inverted position and another block 32 is driven into the recess 38 in such position that the depression 32 therein is exactly opposed to the depression 33 in the block 32 in the upper retainer die block 35. Knockout pins 39 and 40 are provided in the head 14 and block 35 and head 13 and block 36 for suitable co-operation with the blocks 32.

A piece of metal may now be placed between the blocks 32, the retainer die blocks 35 and 36 be brought together and the piece of metal be thus formed to a shape exactly complementary to the shape of the combined depressions 33, with the exception that when it is cooled it will be of a size one shrinkage less than the size of the depressions 33 or, in other words, it will be of a size and shape in exact conformance to the size and shape of the final article desired.

It will be apparent that with this method of operation being carried through, a single master die 11 may be provided which is made in accordance with conventional practice. The master die 11 may be employed to make a number of types 21, and each type 21 may be employed to make a still greater number of dies 32, and each set of dies 32 may be employed to make a correspondingly progressively greater number of finished articles 10. The formation of the types 21 is accomplished in a relatively cheap and simple manner which eliminates the necessity of any chipping, filing or machining such as would be necessary in forming a die or type in accordance with conventional practice, and the dies 32 are correspondingly formed in a simple, cheap and efficient manner at only a fraction of the cost which would be involved in making an equal number of dies in the conventional manner, as in the case of the master die 11. Consequently, where the production is large the cost per set of dies 32 becomes a negligible figure, whereas were these dies made in accordance with conventional practice their cost would be a material factor in the cost of the final product formed by them.

It will be apparent that by this method the master die 11 will be used only at relatively infrequent periods, and in fact so infrequently that it may never need to be replaced during the manufacture of innumerable objects such as 10, and furthermore, inasmuch as the master die 11 controls the size and shape of the final product, all of the objects that are formed from the final dies 32 will be substantially exactly the same, and will not depend upon the skill of a number of workmen in sinking a plurality of dies to the desired shape.

I find that it is extremely important in carrying out the present invention that great precautions be taken to prevent any scaling or oxidization of the surface of the successive die parts produced in the process between the master die 11 and the final die parts 32, for any such scaling or oxidization will necessarily vary the dimensions of the final product as formed by the die parts 32 from that contemplated in the master die 11. Consequently, it is important that not only the metal from which the various elements in the progression are made be protected from oxidization during the initial heating to bring them to a working temperature, but also that while they are being worked in the press or hammer their surface be protected against oxidization in the manner described. By this means I am enabled to provide the final die parts 32 with a high degree of finish on the surface of their depressions, and maintain the dimensions of the depressions within extremely close limits.

The feature of providing the separate retainer die blocks and forming the dies proper as inserts therefor is also an important feature of the present invention, although it is to be understood that the broader aspects of the present invention are not to be limited thereby. In using such separate retainer die blocks such as 15, 18, 30, 35 and 36, it will be recognized that the size of the parts in which the depressions are formed or on which the types are formed are relatively small, easily handled, and their replacement is relatively more economical than in conventional constructions for the reason that the same relative waste of material is not present. This may be illustrated, for instance, particularly well in the case of the dies 32, which are the dies which are subjected to relatively rapid wear due to the fact that they are employed to form the finished product. When these dies become so worn as to need replacement it is necessary only to replace a relatively small amount of metal, namely, that included in the die 32, whereas in conventional constructions it will be necessary to scrap an amount of metal corresponding with that of both the die 32 and the retainer die block 35 or 36, as the case may be.

While I have shown the master die 11 and the type block 20 secured in the retainer die block 15 by a shrink fit, it is pointed out that these members may equally well be secured within the retainer die block by means of a taper fit such as is illustrated in connection with Fig. 6, although I prefer in these particular cases that the die blocks be secured in place by a shrink fit due to the fact that they may be more accurately located and retained than otherwise. The dies 32 may also be secured in place in their respective retainer die blocks 35 and 36 in the same manner by shrinkage, but due to the fact that I prefer to provide means whereby the dies 32 may be removed from the respective retainer die blocks without necessitating the removal of the retainer die blocks from the corresponding head or table of the press or hammer, I prefer that these parts be secured in place by the tapered fit disclosed, whereby they may be easily removed when it is necessary to replace them by heating the retainer die block, if necessary, with a torch or the like, and simply drive the die therefrom through the medium of the knockout pins. After these dies are secured in place by a shrink fit, as in the case of the master die 11 and the type block 20, it will ordinarily be necessary to remove the corresponding retainer die block and by placing it in a bath of molten lead or subjecting to an equivalent heating process without materially heating the insert, cause sufficient expansion of the insert retainer block to permit release of the insert therefrom.

In accordance with the further phase of the present invention I provide a method of altering a die which is once formed, such as the master die indicated in Fig. 11, so as to provide in the depression thereof metal which originally was not present or which has been removed in the formation of the depression. Such an occasion might arise, for instance, were it desired, after the master die 11 is formed, to provide a circumferential groove in the article 10. It will be recognized that in such a case in accordance with conventional practice it would be necessary to scrap the die 11 and make a new one. In accordance with the present invention instead of scrapping the die 11 I insert such metal, as indicated at 50 in Fig. 7, into it by a welding process and am thereby enable to save the cost of remaking the die, which amounts to a considerable saving. The method I employ to add this metal to the die depression whereby such added metal will be as hard or harder than the original die and will not affect the original die in any manner whatsoever outside of changing its shape, is as follows:

I select a welding rod formed of the same metal as the metal of the die 11, which is ordinarily a carbon steel or steel alloy, or I may employ a welding rod formed of an alloy which in itself is too hard to permit a die such as the die 11 to be formed therefrom because of difficulty in working the metal, this last feature being preferable in accordance with this part of the present invention. I preferably heat the die and then deposit metal from this welding rod over the area of the die depression which it is desired to build up, by a welding process in which the atmosphere surrounding the area being welded is deprived of oxygen such as, for instance, by welding the metal in place by the so-called atomic hydrogen method of arc welding. The great importance of using such a method of welding this material in place is that due to the absence of any oxygen the carbon content of the metal in the welding rod will not be materially changed, as it would be in an ordinary welding process, and consequently I may deposit in the die depression a metal which may be hardened substantially to the same or to a greater degree than the metal of the original die. After sufficient metal has been deposited in the die depression to form therefrom the desired added volume, the depression may be reworked to form the added metal into the desired shape and then, when necessary, the whole die may be reheated and rehardened. Where the material deposited in the die depression is of the so-called air hardening type of steel alloy then it may not be necessary, although it may be preferable in many cases, to reharden the entire die. The use of such an alloy is extremely beneficial in such cases where the part added is subject to the greatest wear that occurs in walls of the die depression, for in such case this particular portion may be built up of a material which, although too hard to machine the entire die from, will be extremely hard and wear resisting in the completed die, and thereby enable the die to be used over a greater length of time than would otherwise be possible.

While I have herein described an article to be formed that is identical on both sides of a central plane, so that two die halves of exactly the same contour are employed, and consequently but one master die half and one type is necessary to form both, it will be apparent where it is necessary to provide right and left hand die halves because of the nature of the article to be produced, a separate master die will be necessary to produce the corresponding production die half, and from the foregoing description the method to be followed in such case in accordance with the present invention, will be obvious to those skilled in the art.

Formal changes may be made in the specific embodiment of the invention described without departing from the spirit and substance of the broad invention, the scope of which is commensurate with the appended claims.

I claim:

1. The method of forming a large number of dies which comprises: first forming a master die with provisions for a triple shrinkage in the depression thereof; impressing masses of metal into said master die to form types; and then impressing said types into masses of metal to form the dies desired.

2. The method of forming a large number of dies which comprises: first forming a master die; limiting masses of metal against lateral expansion while simultaneously impressing said masses into said master die to form types while limiting the formation of the flash to a plane spaced from the working faces of the types; and then impressing said types into masses of metal to form the dies desired.

3. The method of forming a large number of dies which comprises: first forming a master die; impressing masses of metal into said master die to form types; and then supporting masses of metal against lateral expansion while impressing said types into the same to form the dies desired and while limiting the formation of the flash to points removed from the faces of the dies.

4. The method of forming a large number of dies which comprises: first forming a master die; heating masses of metal to above the critical temperature of the metal in a non-oxidizing atmosphere; covering said masses of metal with a coating of reducing material and then impressing the same into said die to form types; hardening said types; and then forcing said types into other masses of heated metal to form dies.

5. The method of forming a large number of dies which comprises: first forming a master die; heating masses of metal to above the critical temperature of the metal and impressing said masses into said master die to form types; heating other masses of metal to above the critical temperature of the metal thereof in a non-oxidizing atmosphere; and protecting said other masses of metal against oxidization while impressing said types thereinto to form dies.

6. The method of forming a large number of dies which comprises: first forming a master die; heating masses of metal to above the critical temperature of the metal in a reducing atmosphere; protecting said masses of metal against oxidization while impressing the same into said die to form types; heating other masses of metal to above the critical temperature of the metal thereof in a non-oxidizing atmosphere; and then protecting said other masses of metal against oxidization while impressing said types thereinto to form dies.

7. A method of making a die which comprises forcing a type into the surface of a block of die material of substantially uniform cross section to form a die depression while the ends of the block are initially confined and an intermediate zone of the block is unconfined, whereby to cause a portion of the material in an intermediate zone of the block to flow outwardly to form a flash in the unrestricted zone.

8. A method of forming a die which comprises forming a die impression at one end of a block of substantially uniform transverse cross section and forcing the block to flash in an intermediate zone.

CLAUD L. STEVENS.